US006832088B1

(12) United States Patent
Stumpert

(10) Patent No.: US 6,832,088 B1
(45) Date of Patent: Dec. 14, 2004

(54) IMPLEMENTATION OF BASIC CALL SETUP TRANSPORTING LAYER ADDRESS AND LOGICAL POINT IN BACKWARD DIRECTION IN CELLULAR NETWORKS WITH SEPARATION OF CALL CONTROL AND BEARER CONTROL

(75) Inventor: Martin Stumpert, Hochspeyer (DE)

(73) Assignee: Telefonaktiebolaget LM Ericsson, Stockholm (SE)

( * ) Notice: Subject to any disclaimer, the term of this patent is extended or adjusted under 35 U.S.C. 154(b) by 508 days.

(21) Appl. No.: 09/609,478

(22) Filed: Jul. 5, 2000

Related U.S. Application Data
(60) Provisional application No. 60/144,203, filed on Jul. 19, 1999.

(51) Int. Cl.[7] ................................................ H04Q 7/20
(52) U.S. Cl. ..................... 455/445; 455/432.1; 455/453; 370/395.1
(58) Field of Search .................................. 455/445, 432, 455/435, 434, 455, 464, 466, 550, 560, 453, 432.1, 435.1, 550.1; 370/395.1, 395.03, 400, 401, 402

(56) References Cited

U.S. PATENT DOCUMENTS

| 5,878,347 | A | | 3/1999 | Joensuu et al. | |
|---|---|---|---|---|---|
| 6,377,799 | B1 | * | 4/2002 | Hameleers et al. | 455/422.1 |
| 6,434,140 | B1 | * | 8/2002 | Barany et al. | 370/352 |
| 6,490,451 | B1 | * | 12/2002 | Denman et al. | 455/436 |
| 6,611,516 | B1 | * | 8/2003 | Pirkola et al. | 370/352 |
| 2002/0009997 | A1 | * | 1/2002 | Stuempert et al. | 455/439 |
| 2002/0036983 | A1 | * | 3/2002 | Widegren et al. | 370/230.1 |
| 2002/0062379 | A1 | * | 5/2002 | Widegren et al. | 709/227 |
| 2002/0176405 | A1 | * | 11/2002 | Aijala | 370/352 |
| 2003/0031137 | A1 | * | 2/2003 | Mecklin Tomas | 370/252 |
| 2003/0053463 | A1 | * | 3/2003 | Vikberg et al. | 370/395.1 |
| 2003/0169729 | A1 | * | 9/2003 | Bienn et al. | 370/353 |

FOREIGN PATENT DOCUMENTS

EP     1 039 767     9/2000

OTHER PUBLICATIONS

"The Call Control Protocol in a Separated Call and Bearer Environment," Knight et al.; BT Technology Journal, GB, BT Laboratories, vol. 16, No. 2, Apr. 1, 1998, pps. 75–86, ISSN: 1358–3948.

\* cited by examiner

Primary Examiner—Nay Maung
Assistant Examiner—Edan Orgad

(57) ABSTRACT

The present invention relates to enabling and optimizing call setup in a telecommunication network with separated call control and bearer control, i.e., payload transmission. The separation of call control and payload transmission means that the signaling between control nodes like MSCs, GMSCs and TSCs takes a different route through the network than the payload. This enables the telecommunication network to perform an optimal routing for the payload, using a minimum of resources. Depending on the call case, originating call, terminating call, internal call or transit call, there are only one or maximally two MGW necessary.

31 Claims, 8 Drawing Sheets

IMPLEMENTATION OF BASIC CALL SETUP TRANSPORTING LAYER ADDRESS AND LOGICAL POINT IN BACKWARD DIRECTION IN CELLULAR NETWORKS WITH SEPARATION OF CALL CONTROL AND BEARER CONTROL

CROSS-REFERENCE

This application claims priority on Ser. No. 60/144,203 filed Jul. 19, 1999.

BACKGROUND OF THE INVENTION

A conventional GSM (Global System for Mobile Communications) or UMTS (Universal Mobile Telecommunications Service) core network uses bearer control and call control. The bearer control is the aspect of signaling related to the control of the selection of a path through the transmission network and utilizing (reserving, releasing and setting up) the required resources. The call control is the aspect of signaling related to the subscriber and service control, taking, e.g., the subscriber state into consideration.

In the existing implementations of N-ISDN (Integrated Services Digital Network) the call control and the bearer control are integral with one another. A user plane is associated directly with the control servers, such as MSCs (Mobile Services switching Centers) and GMSCs (Gateway MSCS). Thus, the control nodes implement both application logic for signaling and the user plane.

The present invention is directed to separation of the call control and the bearer control.

SUMMARY OF THE INVENTION

For implementation of GSM and UMTS core networks there is a new approach to separate call control and bearer control.

In accordance with the invention, with the implementation of separation between call and bearer control, the following features are described:

Transfer the MGW address, a termination and possibly the chosen transcoder in a backward direction.

The application software is independent from the used transmission technology, e.g. STM, ATM, IP.

Changes to call control and bearer control signaling to achieve the optimized user plane set up.

Usage of logical points in the MGW to allow different control servers to use one MGW.

Giving an MSC, TSC server the possibility to control several MGWs by allocating one PC per MGW in the control node.

The user plane routing for call setup is optimized significantly.

The user plane routing for supplementary services CFNREA, CFB, CFNRY, CFU is optimized significantly.

The user plane routing for supplementary services CW, HOLD is optimized significantly.

As in the IAM, optionally, a CODEC list can be included, which had been negotiated between the originating MSC1 and a UE1, the terminating MSC2 can negotiate a CODEC with UE2, which it can signal back via the MSC1 to UE1. By that UE1 and UE2 use the same CODEC, which avoids CODECs in the network giving better quality. In the case that CODECs are necessary within the network, e.g., STM (see FIG. 7) CODECs of equal type can be chosen, allowing TFO.

An MGW is chosen by the first control node, which needs to modify the user plane, and not before.

A chosen MGW1 can be linked out, when a later call control server MSC2 chooses a different MGW2 and reports this to the first control server. The first call control server sets up the user plane towards the different MGW2.

Allowing of pooling of conference call devices in MGWs.

Combining different coded speech streams to one MPTY.

Further features and advantages of the invention will be readily apparent from the following specification and the drawings.

DETAILED DESCRIPTION OF THE INVENTION

Figure 1:
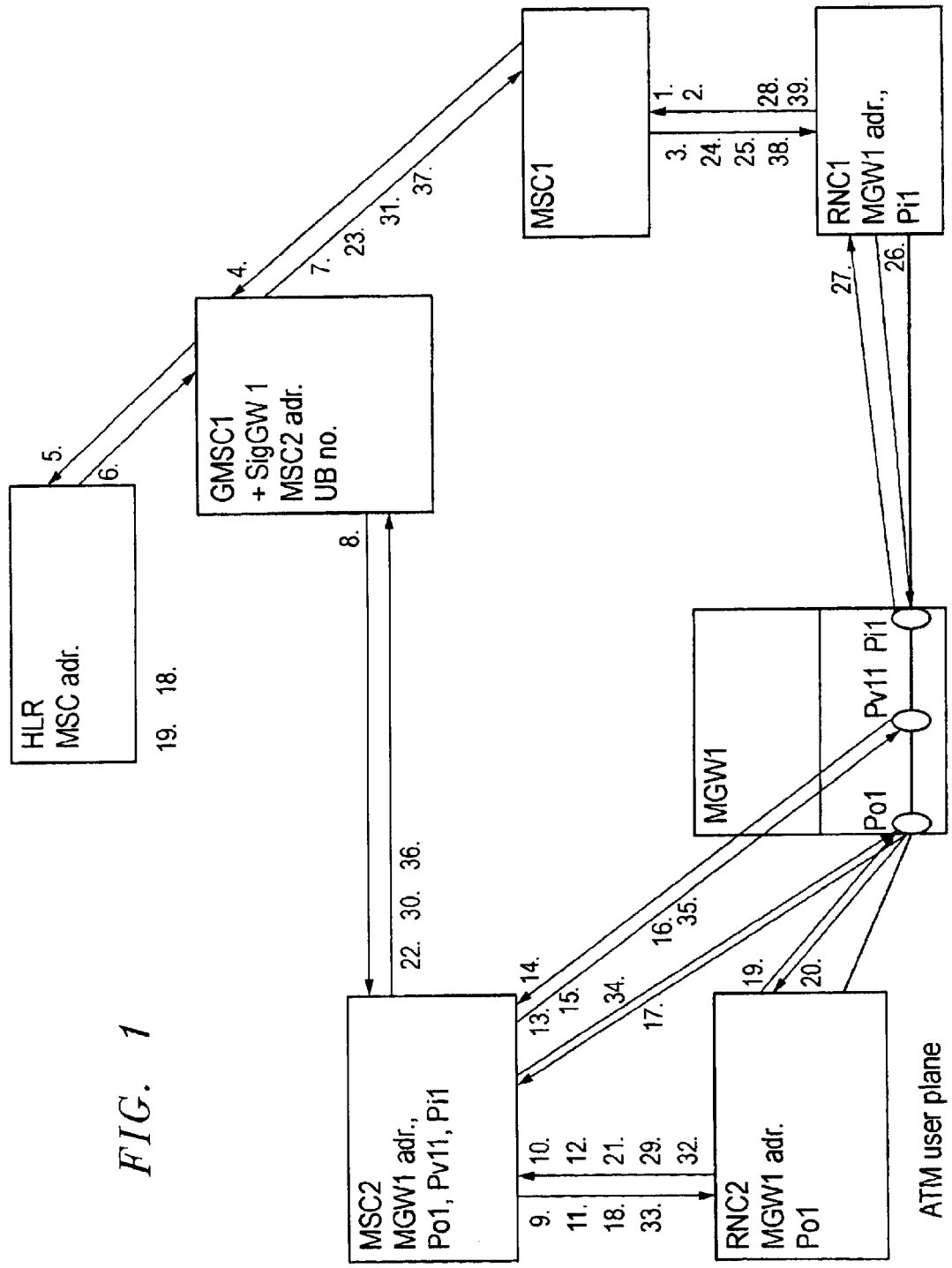
FIG. 1 is a block diagram illustrating basic call setup for a call from UE to LTE, MGW address being transported in the backward direction.

The present invention relates to enabling and optimizing call setup in a telecommunication network with separated call control and bearer control, i.e., set up of a payload connection. The separation of call control and payload transmission means that the signaling between control nodes like MSCs, GMSCs and TSCs takes a different way through the network than the payload. This enables the telecommunication network to perform an optimal routing for the payload, using a minimum of resources. Depending on the call case, originating call, terminating call, internal call or transit call, there are only one or maximally two MGW necessary within a network.

The invention particularly relates to a method comprising the transmission of an identification of a selected MGW in a backward direction. That is, the second control node or a further control node selects the MGW depending on:

the call origin;

the call destination (important for the selection of the terminating control node transit switch or MSC, and for the coding decoding); or the required service (voice, fax or else), for all call cases. In some call cases, further information can be relevant for the selection of an MGW, such as:

the invoked service, e.g. CFB;

the coding of the payload (in the case of compressed voice it is sensible to keep the voice data compressed throughout the network to save transmission capacity);

the framing of the calls.

The invention herein relates to implementation of basic call setup, GSM/UMTS supplementary services CFU, CFB, CFNREA, CFNRY, CW, HOLD and MPTY with transporting a transport layer address, a logical point, the chosen coding type and the chosen framing type in a backward direction in cellular networks with separation of call control and bearer control. Call setup is described in various traffic cases, each illustrated in one of the figures. Each of the figures is a block diagram of a wireless communication system, such as a GSM or UMTS core network, with directional arrows illustrating control signaling between control servers and with MGWs during call setup for the different traffic cases. The written description herein describes information conveyed in each signal. The particular signal is identified herein and in the drawing with a reference numeral.

Many of the calls in the traffic cases described herein involve a fixed terminal or a mobile terminal. Terminals can be, for example, a PC, a fax, or a phone that is located within the network. Such a mobile terminal is referred to herein as User Equipment (UE). The UE communicates with the network via an RNC (Radio Network Controller) using Radio Resource Control (RRC) protocol.

A logical point is a reference locally generated by an MGW (Media Gateway) and only with the MGW address valid to identify a connection in the control servers e.g. MSC/VLR (MSC/Visitor Location Register), GMSC, TSC and in the RNC. For this purpose a logical point P in a first MGW1 is reserved. This reserved point is sent back in a DCP resource response message to the control server and passed on from this control server to another MGW2 or RNC, which shall set up an AAL2 connection. In this set up the logical point P is included to identify to which reserved resource in an MGW1 the connection shall be set up. The logical point is equivalent to a termination used in the H.GCP protocol standardized by ITU.

A control node, such as one of the control servers, discussed above, provides the application logic. The strict separation of the application logic from the user plane handling allows intensive application development and execution. In the described system the control nodes GMSC, MSC, TSC and HLR (only signaling) exist. The interfaces of the control nodes are, e.g., N-ISUP, for call control signaling, DCP signaling for MGW control and MAP for transferring signaling between control servers.

A control node, such as one of the control servers, discussed above, provides the application logic. The strict separation of the application logic from the user plane handling allows intensive application development and execution. In the described system the control nodes GMSC, MSC, TSC and HLR (only signaling) exist. The interfaces of the control nodes are, e.g., N-ISUP, for call control signaling, DCP signaling for MGW control and MAP for transferring connectionless signaling between control servers.

A media gateway (MGW) modifies or switches the user plane. It performs operations such as announcement generation, tone generation, echo cancellation, modem handling for data calls and CODEC (transcoder) handling for speech calls.

A signaling gateway (GW) performs bearer conversion of signaling messages. In UMTS with an ATM core network and ISDN network interworking a conversion from ATM/AAL5 to MTP is done in the signaling gateway. The signaling GW relays the N-ISUP signaling and exchanges the lower transport layer which is carrying the signaling. Therefore the signaling GW is always collocated with e.g. a GMSC or TSC server.

The backbone network transfers the user plane and the control signaling and can, e.g., be based on STM, ATM or IP. The MGW is the edge node of the backbone network.

The following mnemonics, in addition to others which are well known, are used herein:

AAL2 ATM Adaptation Layer Type 2
ACM Address Complete Message
ATM Asynchronous Transfer Mode
BICC Bearer Independent Call Control
CCD Conference Call Device
CIC Circuit Identity Code
CFB Call Forwarding Busy
CFNREA Call Forwarding Not REAchable
CFNRY Call Forwarding No ReplY
CFU Call Forwarding Unconditional
CM Connection Management
CPG Call ProceedinG Message
CW Call Waiting Supplementary Service
DCP Device Control Protocol, e.g. H.GCP
DPC Destination Point Code
DTAP Direct Transfer Application Part
GMSC Gateway MSC
HLR Home Location Register
HOLD Call Hold Supplementary Service
IAM Initial Address Message
IP Internet Protocol
ISDN Integrated Services Digital Network
ISUP ISDN User Part
MAP Mobile Application Part
MGW Media Gateway
MSC Mobile Services Switching Center
MPTY MultiParTY Supplementary Service
OPC Originating Point Code
PC Point Code
P logical Point
RANAP Radio Access Network Application Part
RNC Radio Network Controller
SigGW Signaling GateWay
STM Synchronous Transfer Mode
TSC Transit Switching Center
UE User Equipment (mobile)

In the new network architecture described herein, N-ISDN is used for call control, while STM, AAL2 or IP are used for bearer control and usage of the user plane.

The generation of control tones are omitted in this description and shall be handled in other known manners.

The MGW address can be transported on BICC ISDN for e.g., as a sub-layer transport address. To find the TSC and/or the MGW address, some IN service, the routing analysis or the B-number analysis, are used. The TSC is then chosen for an outgoing call to the ISDN. The MGW is chosen based on capabilities required for handling the call, e.g. which devices such as CODECs, coding, compression, framing scheme, announcement machines, tone senders, or modems are required. In the examples, for simplification, only the B-number analysis is mentioned. The selection depends mainly on the destination. Depending on the destination a group of MGWs with different capabilities can be found. Then an MGW with the needed capabilities, e.g., CCDs, modem support, Internet connectivity is chosen.

All resources which have been reserved by a server have to be released by that server. For simplifying the message flows the release of resources in the MGW is omitted from this description.

In the examples, a one-to-one relation is assumed between the first control node GMSC/TSC server inside the core network (CN) and the first MGW inside the CN.

To be able to receive incoming calls over different MGWs, but with the control signaling (IAM) to the same GMSC, the GMSC needs to have one point code per MGW, where the ISDN user plane can terminate. Out of the DPC, to which the IAM was sent, the GMSC can derive the MGW to which the ISDN user plane was set up.

To allow that a TSC controls more than one MGW for outgoing (incoming) traffic the TSC needs one point code per controlled MGW. For a chosen MGW the TSC has to use a certain OPC. Depending on the chosen OPC the transit switch can distinguish the ISDN user planes received from different MGWs.

Another alternative solution to receive or send user plane to different MGWs is that different signaling routes are used between servers, if the user plane is routed via different MGWs.

Another alternative solution to receive or send user plane to different MGWs is that different signaling routes are used between servers, if the user plane is routed via different MGWs.

A third alternative to receive or send user plane to different MGWs from/to a transit switch and control signaling from/to one server is that different CICs are used for different MGWs, if the user plane is routed via different MGWs.

The concept of identifying the originating MGW by OPC used in the IAM message instead of transporting the MGW address in the IAM message, is also possible through the whole CN, but it requires, for a network of m MGWs, m different point codes in each of the control servers, which can control the MGWs.

Another alternative solution to transfer the knowledge of an MGW from one server to the other is to use different routes for signaling, if the user plane was routed to different MGWs. If a TSC can receive calls from m MGWs, then m different signaling routes towards the RNC are required.

In the following description of the various drawings, various signal names are used. Some of these signals are conventional in nature. The DTAP messages are defined in GSM 04.08 V8.0.0 and UMTS 24.08 V3.0.0. The RANAP messages are defined in UMTS 25.413 V1.0.2. The MAP messages are defined in GSM 09.02 V6.3.0 and UMTS 29.002 V3.3.2. The AAL2 messages are used for bearer control in accordance with the invention. The DCP messages, which are particularly described below, are used for communications between control nodes and the MGWs in connection with resource requests and assignments. The ISDN messages are used for signaling between network control nodes and external ISDN networks.

FIG. 1 shows a call from UE to UE, with an MGW address being transported in a backward direction. Here, even though the call is initiated at a first control node MSC1, the MGW1 is chosen in a further control node MSC2. Then the MGW1 address and a logical point are transferred in the backward direction with ISUP ACM/CPG/APM or some new message to the originating MSC1. The MSC2 can negotiate a CODEC with UE B and passes this CODEC type on to UE A. By this no CODEC is needed in MGW1. This leads to better speech quality by avoiding transcoding. Also less transmission capacity is needed for transferring coded speech and the CODEC hardware is saved. The MSC1 then commands RNC1 to setup the user plane connection towards MGW1 and commands MGW1 to through connect. Then MSC2 commands RNC2 to set up the user plane connection towards MGW1. Only one MGW is needed in this traffic case for switching.

The following signals are used in the traffic example of FIG. 1.

1. DTAP, CM service request
2. DTAP, Setup (CODEC (x, y, z))
3. DTAP, Call Proceeding
4. ISDN, IAM (OPC, DPC, CIC, CODEC (x, y)) Call setup is requested from the originating MSC1 for CODEC (x, y) used.
5. MAP, SendRouting Information request The GMSC1 interrogates the HLR for routing information.
6. MAP, SendRouting Information response The GMSC1 receives the forwarding to number and an indication, if a notification shall be given to the calling party.
7. ISDN, Address Complete Message (ACM) The ACM message is sent from the GMSC1 to the MSC1.
8. ISDN, Initial Address Message IAM (OPC, DPC, CIC) The IAM message is sent from the GMSC1 to the MSC2.
9. RANAP, Paging
10. DTAP, Paging Response
11. DTAP, Setup (CODEC (x, y))
12. DTAP, Call confirmed (CODEC (x))
13. DCP, resource request (MGW1, CIC) The MSC2 chooses MGW1 and requests resources.
14. DCP, resource response (Pi1, Pv11) An incoming point Pi2 is returned from the MGW1.
15. DCP, Through connect (Pv11, Pi1) The MSC2 commands the MGW1 to backward through connect the virtual point Pv11 and the incoming point Pi1. In N-ISUP the originating switch does the backward through connection instead.
16. DCP, resource request (MGW1, Pv11) Resources are requested for the outgoing traffic.
17. DCP, resource response (Po1) An outgoing point Po1 is returned from the MGW1.
18. RANAP, Assignment Request
19. AAL2, Establish Request
20. AAL2, Establish confirm
21. RANAP, Assignment Response
22. ISUP, new APM (MGW1, Pi1)
23. ISUP, new APM (MGW1, Pi1)
24. DTAP, Progress Message (CODEC (x))
25. RANAP, Assignment Request Assignment to MGW1.
26. AAL2, Establish Request
27. AAL2, Establish confirm
28. RANAP, Assignment Response
29. DTAP, Alert
30. ISDN, Address Complete Message ACM
31. ISDN, Call Proceeding CPG
32. DTAP, Connect
33. DTAP, Connect ack
34. DCP, Through connect (Pv11, Po1) The MSC2 commands the MGW1 to through connect the virtual point Pv11 and the outgoing point Po1.
35. DCP, Through connect (Pv11, Pi1) The MSC2 commands the MGW1 to through connect the incoming point Pi1 and the virtual point Pv11 in both directions.

Figure 2:
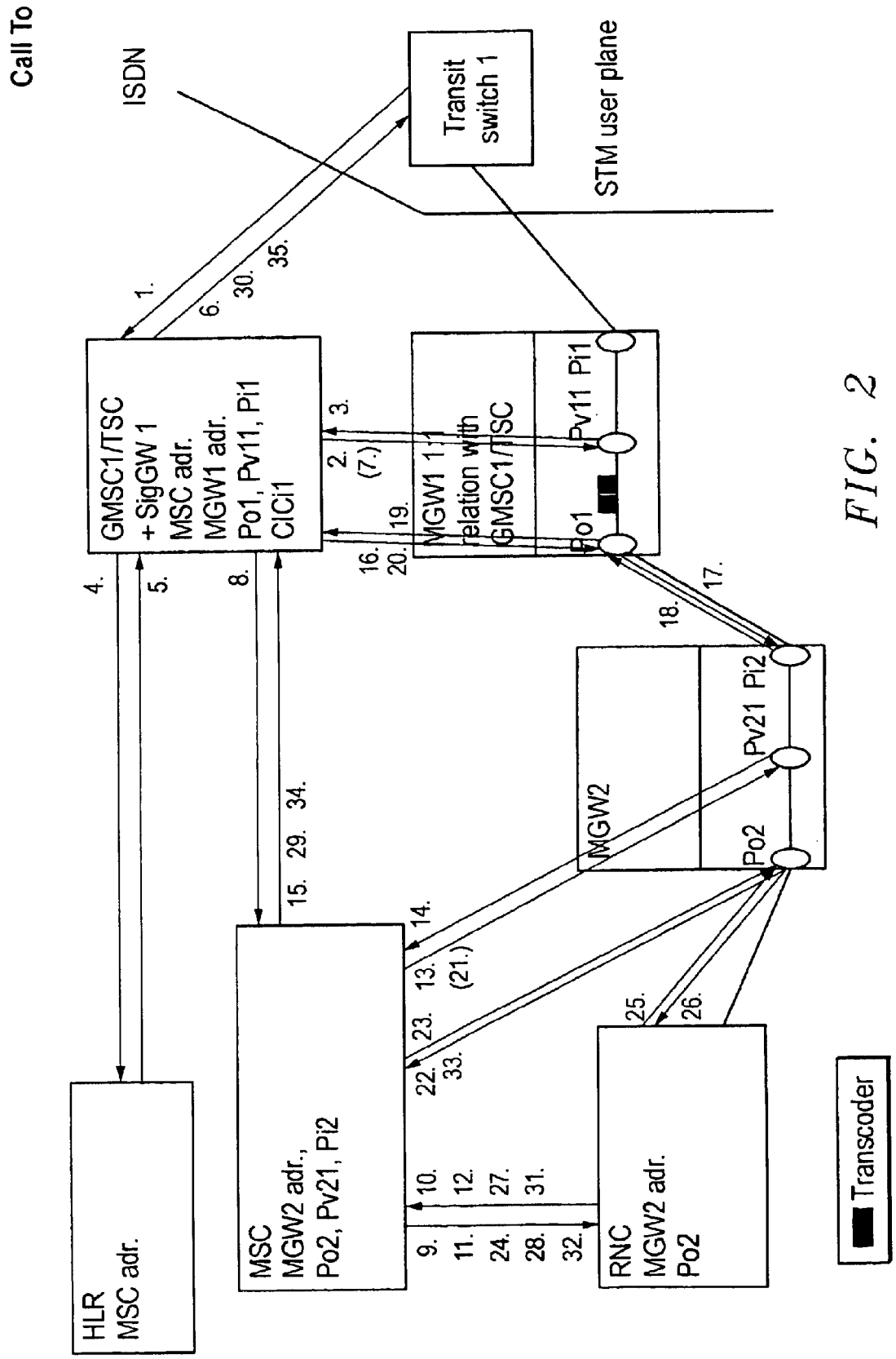
FIG. 2 is a block diagram illustrating basic call setup for a call to UE, MGW address being transported in the backward direction.

36. ISUP, Answer Message ANM
37. ISUP, Answer Message ANM
38. DTAP, Connect
39. DTAP, Connect ACK FIG. 2 shows a call to UE originating outside of the network, with an MGW address being transported in a backward direction. Here a subscriber B is calling a served UEA. It is assumed that the external N-ISUP does not support the new ISUP backwards message APM.

Figure 3:
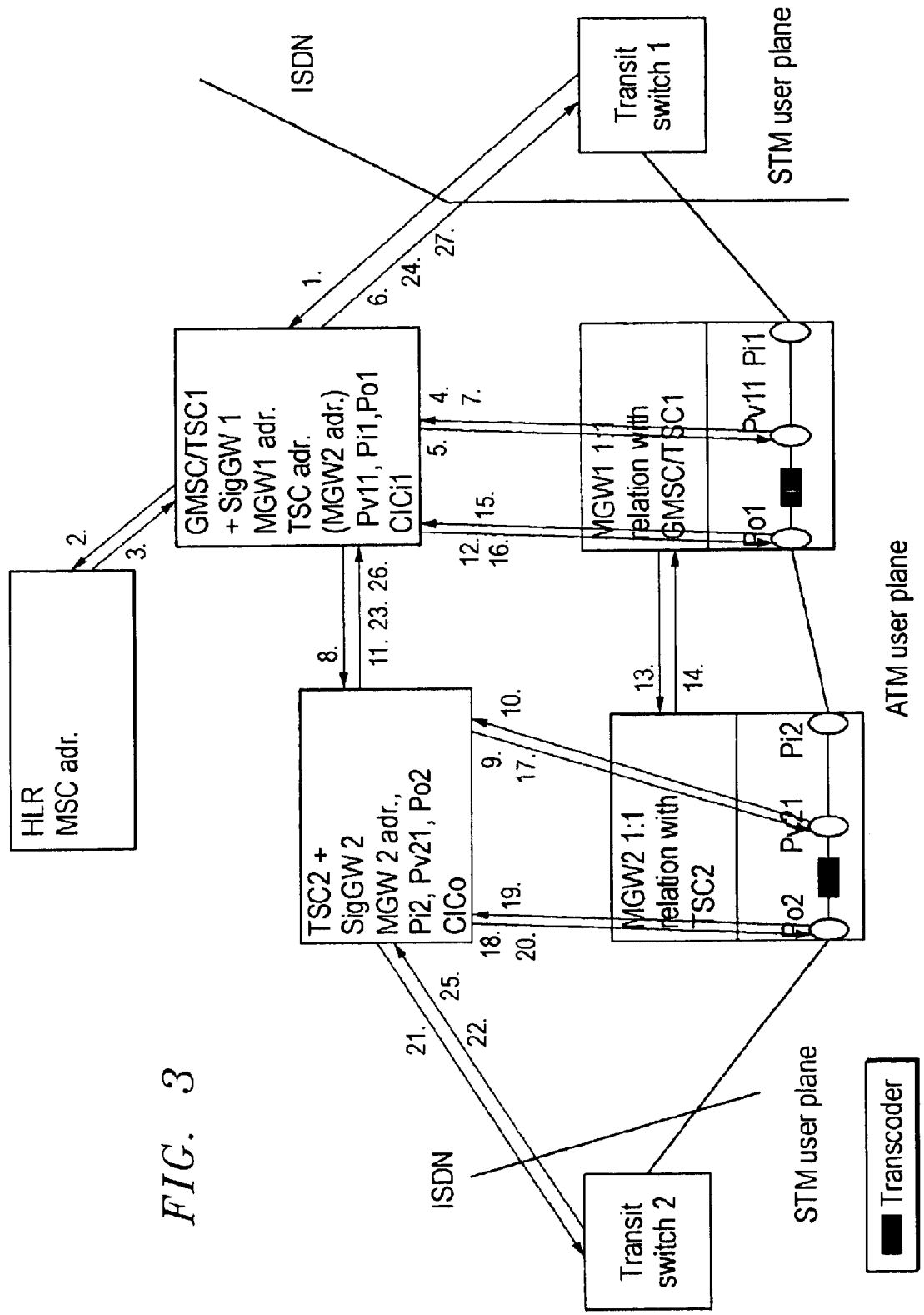
FIG. 3 is a block diagram illustrating basic call setup for a roaming call to UE in own PLMN, MGW address being transported in the backward direction.

1. ISDN, Initial Address Message IAM (OPC, DPC, CIC) Call setup is requested from an external ISDN network for a mobile terminated call attempt. In this example the GMSC1/TSC and the Signaling Gateway 1 are collocated.
2. DCP, resource request (MGW1, CICi1) Resources are requested from the MGW1 for the call identified by its CIC, which were chosen by the transit switch 1 of the ISDN network.
3. DCP, resource response (Pi1, Pv11) An incoming point Pi1 and a virtual point Pv11 are returned from the MGW1.
4. MAP, SendRouting Information request The GMSC1 interrogates the HLR for routing information.
5. MAP, SendRouting Information response The GMSC I receives the MSC address.
6. ISDN, Address Complete Message ACM The ACM message is sent from the GMSC1 to the transit switch 1.
7. Optional DCP, Through connect (Pi1, Pv11) The GMSC1 commands the MGW1 to through connect the incoming point Pi1 and the virtual point Pv11. Optionally, the whole MGW1 connection can be through connected with one DCP, Through connect (Pi1, Po1) message.
8. ISDN, IAM (OPC, DPC, CIC, CODEC (x, y)) The IAM message is sent from the GMSC1 to the MSC. The MSC is selecting the MGW2.
9. RANAP, Paging
10. DTAP, Paging Response
11. DTAP, Setup (CODEC (x, y))
12. DTAP, Call confirmed (CODEC (x))
13. DCP, resource request (MGW2) Resources are requested from the MGW2 for the call identified by its CIC.
14. DCP, resource response (Pi1, Pv21) An incoming point Pi2 and a virtual point Pv21 are returned from the MGW2.
15. ISUP, new APM (MGW2, Pi2, CODEC x)
16. DCP, Setup connection (MGW1, MGW2, Pv11, Pi2) The GMSC1 requests resources for an outgoing call identified by its virtual CIC and commands the MGW1 to set up a connection towards Pi2 in MGW2.
17. AAL2, Establish Request
18. AAL2, Establish confirm
19. DCP, Setup connection response (Po1) The MGW1 signals back that the outgoing connection has been set up successfully and returns an outgoing point Po1.
20. DCP, Through connect (Po1, Pv11) The GMSC1 commands the MGW1 to through connect the outgoing point Po1 and the virtual point Pv11. Optionally, the whole MGW1 connection can be through connected with one DCP, Through connect (Pi1, Po1) message.
21. Optional DCP, Through connect (Pi2, Pv21) The MSC commands the MGW2 to through connect the incoming point Pi2 and the virtual point Pv21.
22. DCP, resource request (MGW2, Pv21) Resources are requested for the outgoing traffic.
23. DCP, resource response (Po2) An incoming point Po2 is returned from the MGW2.
24. RANAP, Assignment Request
25. AAL2, Establish Request
26. AAL2, Establish confirm
27. RANAP, Assignment Response
28. DTAP, Alert
29. ISDN, Address Complete Message ACM
30. ISDN, Call Proceeding CPG
31. DTAP, Connect
32. DTAP, Connect ack
33. DCP, Through connect (Po2, Pv21) The MSC commands the MGW2 to through connect the outgoing point Po2 and the virtual point Pv21. Optionally, the whole MGW2 connection can be through connected with one DCP, Through connect (Pi2, Po2) message.
34. ISUP, Answer Message ANM
35. ISUP, Answer Message ANM FIG. 3 shows a roaming call to UE in own PLMN, with an MGW address being transported in a backward direction.

It is assumed that the external N-ISUP does not support the new ISUP backwards message APM. The linking of transcoders is an option. The speech can be transferred without linking of transcoders as non-compressed speech.

1. ISDN, Initial Address Message IAM (OPC, DPC, CIC) Call setup is requested from an external ISDN network for a mobile terminated call attempt. In this example the GMSC/TSC1 and the Signaling Gateway 1 are collocated.
2. MAP, SendRouting Information request The GMSC interrogates the HLR for routing information.
3. MAP, SendRouting Information response The GMSC receives the roaming number of an MSC outside the PLMN. The roaming number received from HLR is analysed and a TSC is received from the B-number analyse.
4. DCP, resource request (MGW1, CIC) Resources are requested from the MGW1 for the call identified by its CIC, which were chosen by the transit switch 1 of the ISDN network.
5. DCP, resource response (Pi1, Pv11) An incoming point Pi1 and a virtual point Pv11 are returned from the MGW1.
6. ISDN, Address Complete Message ACM The ACM message is sent from the GMSC to the transit switch 1.
7. DCP; Through connect (Pi1, Pv11) The GMSC commands the MGW1 to through connect the incoming point Pi1 and the virtual point Pv11. Optionally, the whole MGW1 connection can be through connected with one DCP, Through connect (Pi1, Po1) message.
8. ISDN, IAM (OPC, DPC, CIC, optional CODEC (x, y)) The IAM message is sent from the GMSC to the TSC2. The TSC2 is selecting the MGW2.
9. DCP, resource request (MGW2) Resources are requested by the TSC2 from the MGW2 for the call identified by its CIC.
10. DCP, resource response (Pi2, Pv21) An incoming point Pi2 and a virtual point Pv21 are returned from the MGW2.
11. ISUP, new APM (MGW2, Pi2, optional CODEC (x))
12. DCP, Setup connection (MGW1, MGW2, PV11, Pi2) The GMSC requests resources for an outgoing call identified by its virtual CIC and commands the MGW1 to set up a connection towards Pi2 in MGW2.
13. AAL2, Establish Request
14. AAL2, Establish confirm
15. DCP, Setup connection response (Po1) The MGW1 signals back that the outgoing connection has been set up successfully and returns an outgoing point Po1.
16. DCP, Through connect (Po1, Pv11) The GMSC commands the MGW1 to through connect the outgoing point Po1 and the virtual point Pv11. Optionally, CODEC x is linked in.
17. DCP, Through connect (Pi2, Pv21) The TSC2 commands the MGW2 to through connect the incoming point Pi2 and the virtual point Pv21.
18. DCP, Setup connection (MGW2, Pv21) The TSC2 requests resources for an outgoing call identified by its virtual CIC and commands the MGW2 to set up a connection towards the transit switch 2.
19. DCP, Setup connection response (Po2, CIC) The MGW2 signals back that the outgoing connection has been set up successfully and returns an outgoing point Po2.
20. DCP, Through connect (Po2, Pv21) The TSC2 commands the MGW2 to through connect the outgoing point Po2 and the virtual point Pv21.
21. ISDN, Initial Address Message IAM (OPC, DPC, CIC) The IAM message is sent from the TSC2 to the transit switch 2.
22. ISDN, Address Complete Message ACM
23. ISDN, Call Proceeding CPG
24. ISDN, Call Proceeding CPG
25. ISDN, Answer Message ANM
26. ISDN, Answer Message ANM The ANM message is passed on by the TSC2.
27. ISDN, Answer ANM The ANM message is passed on by the GMSC.

Figure 4:
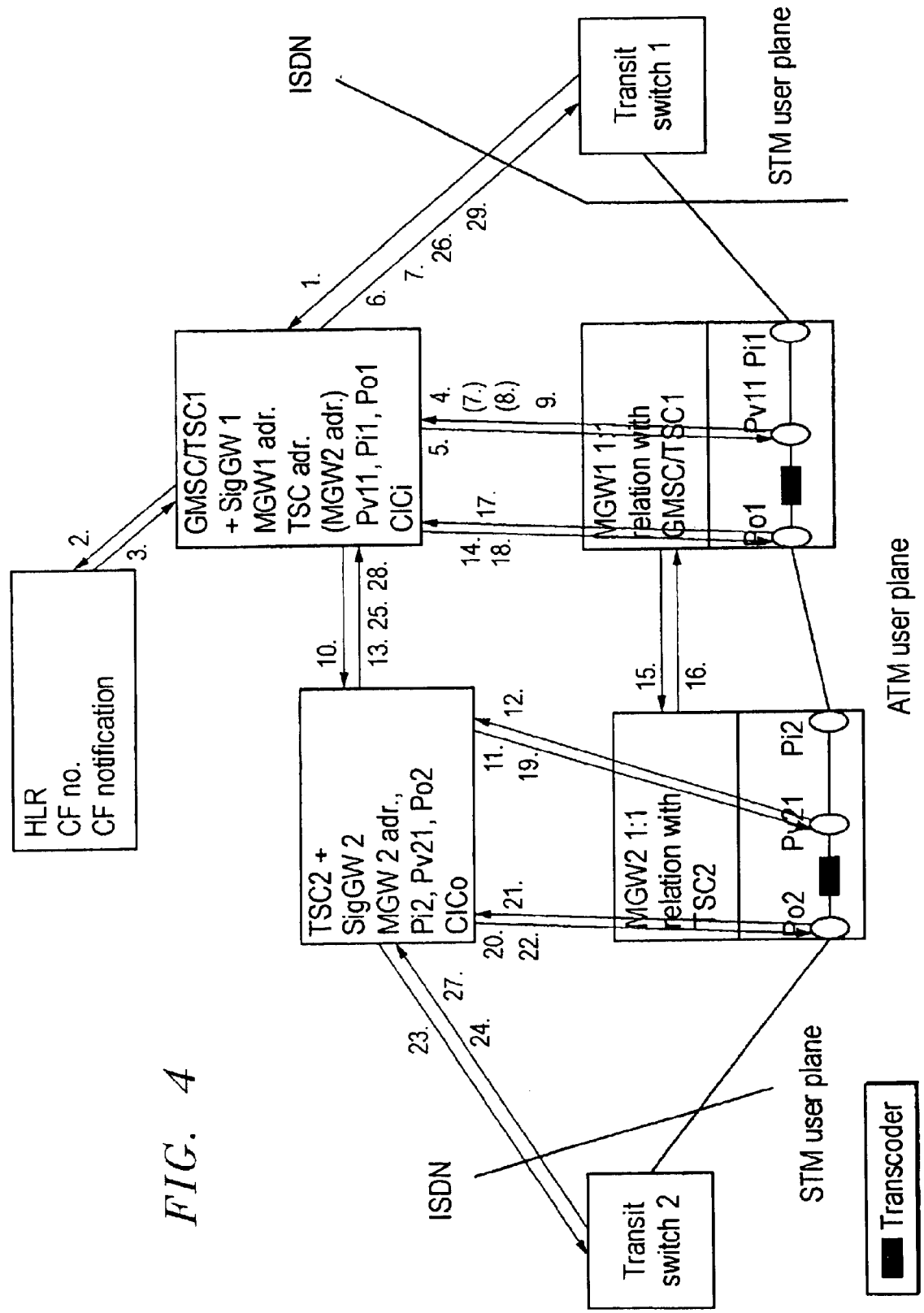
FIG. 4 is a block diagram illustrating basic call setup for call forwarding in GMSC to ISDN no., MGW address being transported in the backward direction.

FIG. 4 shows a call forwarding example in GMSC to an ISDN subscriber identified by an ISDN no., with an MGW address being transported in a backward direction. For CFNREA in MSC the same handling applies as for CFNREA in GMSC. Therefore only the signaling for CFNREA in GMSC are described below.

It is assumed that the external N-ISUP does not support the new ISUP backwards message APM. The inlinking of transcoders is an option. The speech can be transferred without inlinking of transcoders as non-compressed speech.

1. ISDN, Initial Address Message IAM (OPC, DPC, CIC) Call setup is requested from an external ISDN network for a mobile terminated call attempt. In this example the GMSC/TSC1 and the Signaling Gateway 1 are collocated.
2. MAP, SendRouting Information request The GMSC interrogates the HLR for routing information.
3. MAP, SendRouting Information response The GMSC receives the forwarding to number and an indication, if a notification shall be given to the calling party. The forwarded-to number received from HLR is analyzed and a TSC2 address is received from the B-number analysis.
4. DCP, resource request (MGW1, CIC) Resources are requested from the MGW1 for the incoming call identified by its CIC, which were chosen by the transit switch 1 of the ISDN network.
5. DCP, resource response (Pi1, Pv11) An incoming point Pi1 and a virtual point Pv11 are returned from the MGW1.
6. ISDN, Address Complete Message ACM The ACM message is sent from the GMSC/TSC1 to the transit switch 1. An outband notification can be included in the ACM message. This saves signaling, in and out linking of announcement machine and user plane transmission.
7. Optional DCP, Connect announcement machine (Pi1) Optionally, the announcement machine is connected, if inband notification is required.
8. Optional DCP, Disconnect announcement machine (Pi1) After the announcement the announcement machine is disconnected.
9. DCP, Through connect (Pi1, Pv11) The GMSC/TSC1 commands the MGW1 to through connect the incoming point Pi1 and the virtual point Pv11.
10. ISDN, IAM (OPC, DPC, CIC, optional CODEC (x, y)) The IAM message is sent from the GMSC/TSC1 to the TSC2. The TSC2 selects the MGW2 and optional CODEC x.
11. DCP, resource request (MGW2) Resources are requested from the MGW2 for the call identified by its CIC.
12. DCP, resource response (Pi2, Pv21) An incoming point Pi2 and a virtual point Pv21 are returned from the MGW2.
13. ISUP, new APM (MGW2, Pi2, optional CODEC (x))
14. DCP, Setup connection (MGW1, MGW2, Pv11, Pi2) The GMSC/TSC1 requests resources for an outgoing call identified by its virtual CIC and commands the MGW1 to set up a connection toward Pi2 in MGW2.
15. AAL2, Establish Request
16. AAL2, Establish confirm
17. DCP, Setup connection response (Po1) The MGW1 signals back that the outgoing connection has been set up successfully and returns an outgoing point Po1.
18. Through connect (Po1, Pv11) The GMSC/TSC1 commands the MGW1 to through connect the outgoing point Po1 and the virtual point Pv11. Optionally, CODEC x is linked in.
19. DCP, Through connect (Pi2, Pv21) The TSC2 commands the MGW2 to through connect the incoming point Pi2 and the virtual point Pv21.
20. DCP, Setup connection (MGW2, Pv21) The TSC2 requests resources for an outgoing call identified by its virtual CIC and commands the MGW2 to set up a connection towards the transit switch 2.
21. DCP, Setup connection response (Po2, CIC) The MGW2 signals back that the outgoing connection has been set up successfully and returns an outgoing point Po2.
22. DCP, Through-connect (Po2, Pv21) The TSC2 commands the MGW2 to through connect the outgoing point Po2 and the virtual point Pv21. Optionally, CODEC x is linked in.
23. ISDN, Initial Address Message IAM (OPC, DPC, CIC) The IAM message is sent from the TSC2 to the transit switch 2.
24. ISDN, Address Complete Message ACM
25. ISDN, Call Proceeding CPG
26. ISDN, Call Proceeding CPG
27. ISDN, Answer Message ANM
28. ISDN, Answer Message ANM The ANM message is passed on by the TSC2.
29. ISDN, Answer ANM The ANM message is passed on by the GMSC/TSC1.

Figure 5:
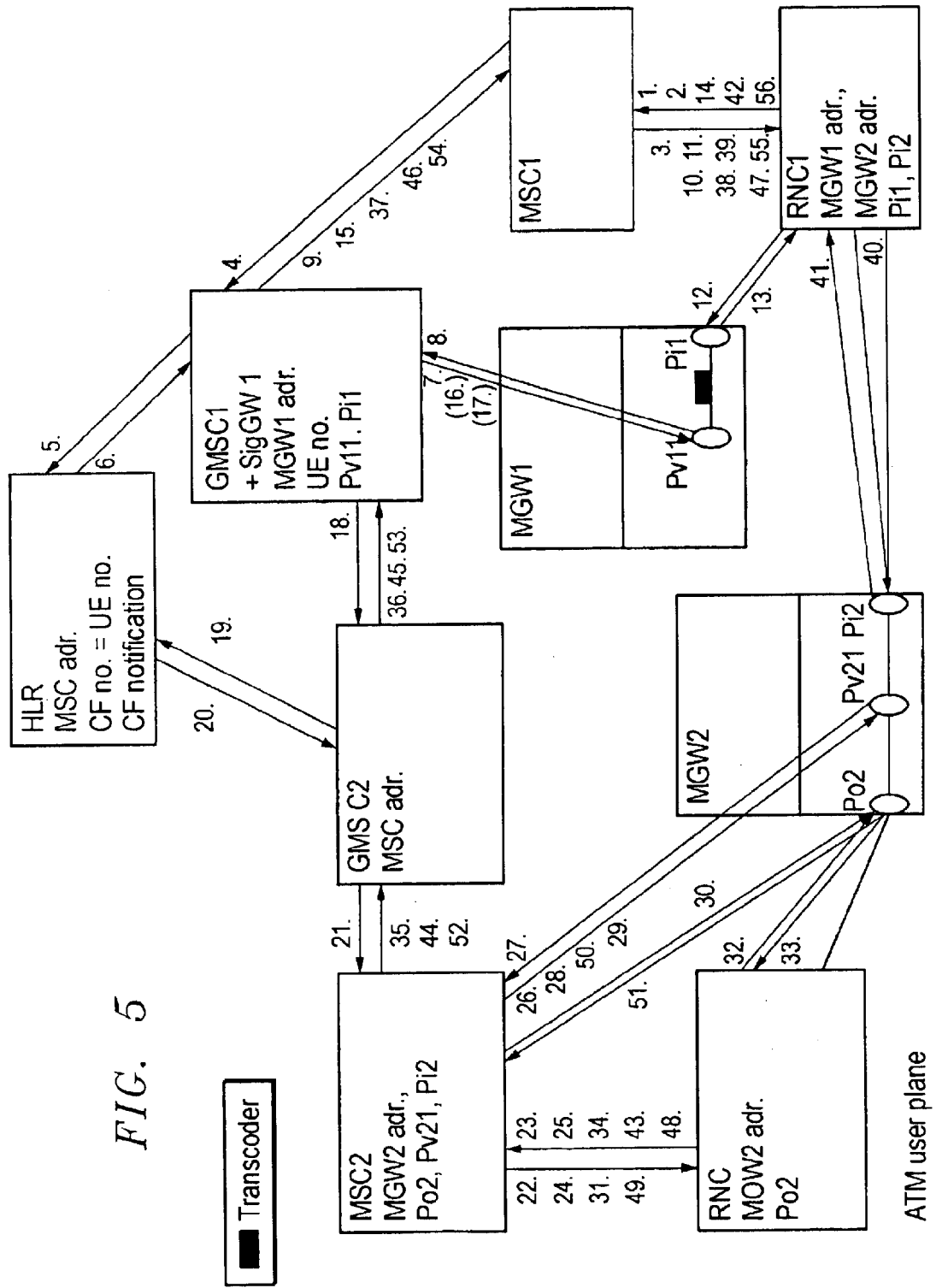
FIG. 5 is a block diagram illustrating basic call setup for a call from UE with call forwarding in GMSC to UE, MGW address being transported in the backward direction.

FIG. 5 shows a call from UE with Call forwarding in GMSC to a subscriber identified by a UE no., with an MGW address being transported in a backward direction. In this example, a UE A calls a UE B. As the UE B is not reachable, a CFNREA with announcement is invoked in GMSC1. The forwarding is done to a third UE C. Therefore the call is routed towards GMSC2, which then contacts MSC2, where UE C is located. MSC2 then selects an MGW2, which it passes on in backward direction to MSC1. MSC1 commands then RNC1 to set up the connection towards MGW2.

For subsequent forwarding to UE in GMSC, instead of GMSC2, GMSC2, GMSC3, etc. have to be included. As the MSC1 passes the CODEC list to the MSC2, the MSC2 negotiates with the UE 2 to choose a CODEC from the list and report it in backward direction. The UE I has then to use this CODEC and no further coding is required in the network. In-this example the announcement machine uses CODEC x and the UE C uses CODEC y.

Figure 6:
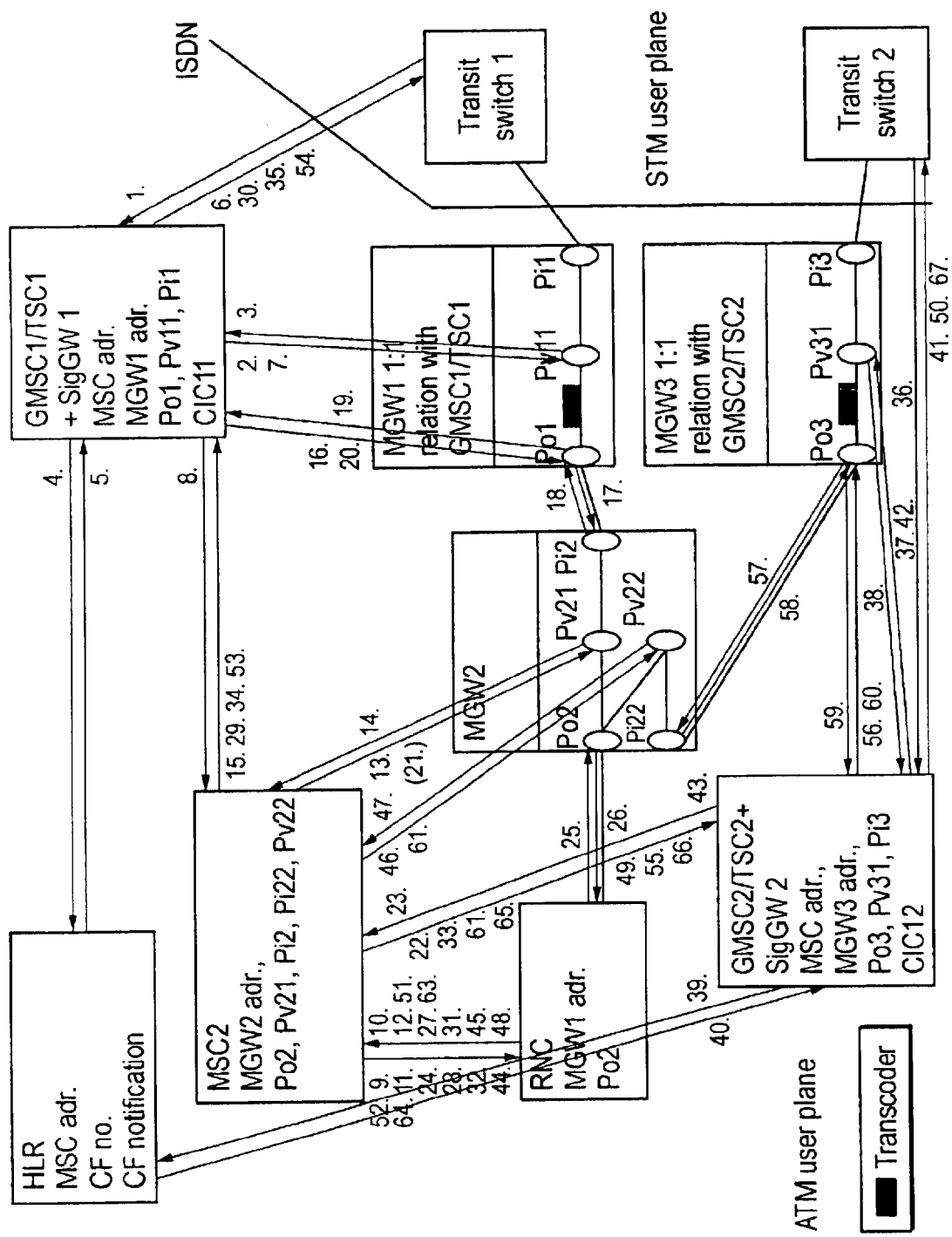
FIG. 6 is a block diagram illustrating basic call setup for call waiting and accepting the waiting call in one MGW, MGW address being transported in the backward direction.

1. DTAP, CM service request
2. DTAP, Setup (CODEC (x, y))
3. DTAP, Call Proceeding
4. ISDN, IAM (OPC, DPC, CIC, CODEC (x, y)) Call setup is requested from the originating MSC1.
5. MAP, SendRouting Information request The GMSC1 interrogates the HLR for routing information.
6. MAP, SendRouting Information response The GMSC1 receives the forwarding to number and an indication, if a notification shall be given to the calling party.
7. DCP, resource request (MGW1, CIC) Resources are requested from the MGW1 for the call identified by its CIC.
8. DCP, resource-response (Pi1, Pv11) An incoming point Pi1 and a virtual point Pv11 are returned from the MGW1.
9. ISUP, new APM (MGW1, Pi1, CODEC x) As an announcement is needed, GMSC1 selects MGW1 and CODEC x.
10. DTAP, Progress (CODEC x)
11. RANAP, Assignment Request (MGW1, Pi1)
12. AAL2, Establish Request
13. AAL2, Establish Confirm
14. RANAP, Assignment Response
15. ISDN, Address Complete Message ACM The ACM message is sent from the GMSC1 to the MSC1. An outband notification can be included in the ACM message. This saves signaling, in and out linking of announcement machine and user plane transmission.
16. DCP, Connect announcement machine (Pi1) The announcement machine is connected, as inband notification is required.
17. DCP, Disconnect announcement machine (Pi1) After the announcement the announcement machine is disconnected.
18. ISDN, IAM (OPC, DPC, CIC, CODEC (x, y)) The IAM message is sent from the GMSC1 to the GMSC2.
19. MAP, SendRouting Information request The GMSC2 interrogates the HLR for routing information.
20. MAP, SendRouting Information response The GMSC2 receives the MSC address from HLR.
21. ISDN, IAM (OPC, DPC, CIC, CODEC (x, y)) The IAM message is sent from the GMSC2 to the MSC2. MSC2 selects MGW2.
22. RANAP, Paging
23. DTAP, Paging Response
24. DTAP, Setup (CODEC (x, y))
25. DTAP, Call confirmed (CODEC y)
26. DCP, resource request (MGW2, CIC) Resources are requested from the MGW2 for the call identified by its CIC.
27. DCP, resource response (Pi2, Pv21); An incoming point Pi2 is returned from the MGW2.
28. DCP, Through connect (Pv21, Pi2) The MSC2 commands the MGW2 to backward through connect the virtual point Pv21 and the incoming point Pi2. In N-ISUP the originating switch does the backward through connection instead.
29. DCP, resource request (MGW1, Pv21) Resources are requested for the outgoing traffic.
30. DCP, resource response (Po2) An outgoing point Pi2 is returned from the MGW2.
31. RANAP, Assignment Request
32. AAL2, Establish Request
33. AAL2, Establish confirm
34. RANAP, Assignment Response
35. ISUP, new APM (MGW2, Pi2, CODEC y)
36. ISUP, new APM (MGW2, Pi2, CODEC y)
37. ISUP, new APM (MGW2, Pi2, CODEC y)
38. RANAP, Assignment Request Subsequent assignment to MGW2. This will also release the connection from RNC1 to MGW1.
39. DTAP, Progress (CODEC x)
40. AAL2, Establish Request
41. AAL2, Establish confirm
42. RANAP, Assignment Response
43. DTAP, Alert
44. ISDN, Address Complete Message ACM
45. ISDN, Call Proceeding CPG
46. ISDN, Call Proceeding CPG
47. DTAP, Alerting
48. DTAP, Connect
49. DTAP, Connect ack
50. DCP, Through connect (Pv21, Pi2) The MSC2 commands the MGW2 to through connect the incoming point Pi2 and the virtual point Pv21 in both directions.
51. DCP, Through connect (Pv21, Po2). The MSC2 commands the MGW2 to through connect the virtual point Pv21 and the incoming point Po2. Optionally, the MGW2 connection can be through connected with one DCP, Through connect (Pi2, Po2) message.
52. ISUP, Address Complete Message ANM
53. ISUP, Address Complete Message ANM
54. ISUP, Address Complete Message ANM
55. DTAP, Connect
56. DTAP, Connect ACK FIG. 6 shows call waiting and accepting the waiting call in one MGW, with an MGW address being transported in a backward direction.

Here a subscriber A is calling a served UE B, who has the supplementary services CW and HOLD. After the call from subscriber A to UE B is active another terminating call from a subscriber C over MGW2 to UE B is received. UE B accepts the waiting call from C and therefore has to put the call from A on hold. The user plane for the call from subscriber A to UE B is routed from MGW1 to the MGW2 and the user plane of the call from subscriber C to UE B is routed from MGW3 to MGW2 as MGW2 offers CCDs. After UE B accepts the waiting call, the MSC commands MGW2 to switch from the former active call to the waiting call. The active call becomes then the held call. It is assumed that both the active and the waiting call use the same service, e.g., speech with the same CODEC, so that the AAL2 connection between RNC and MGW1 can be reused. This allows fast switches between the active and the held call, and if a multiparty is required later on, only a conference call device has to be linked in the MGW2.

This mechanism requires for this traffic case three MGWs instead of two. If the subscribers C is a mobile subscriber in this network then only two MGWs are needed, MGW1 and MGW2.

It is assumed that the external N-ISUP does not support the new ISUP backwards message APM. If a multiparty is required later on, a conference call device has to be linked in the MGW2.

As currently CCDs only support PCM coding, on the incoming legs the same CODEC as used in the respective MGW has to be used, e.g., CODEC x on each call leg. Another solution is to send an ISUP message, e.g., APM to each GMSC/TSC, to command it to link out the CODEC.

Figure 7A:
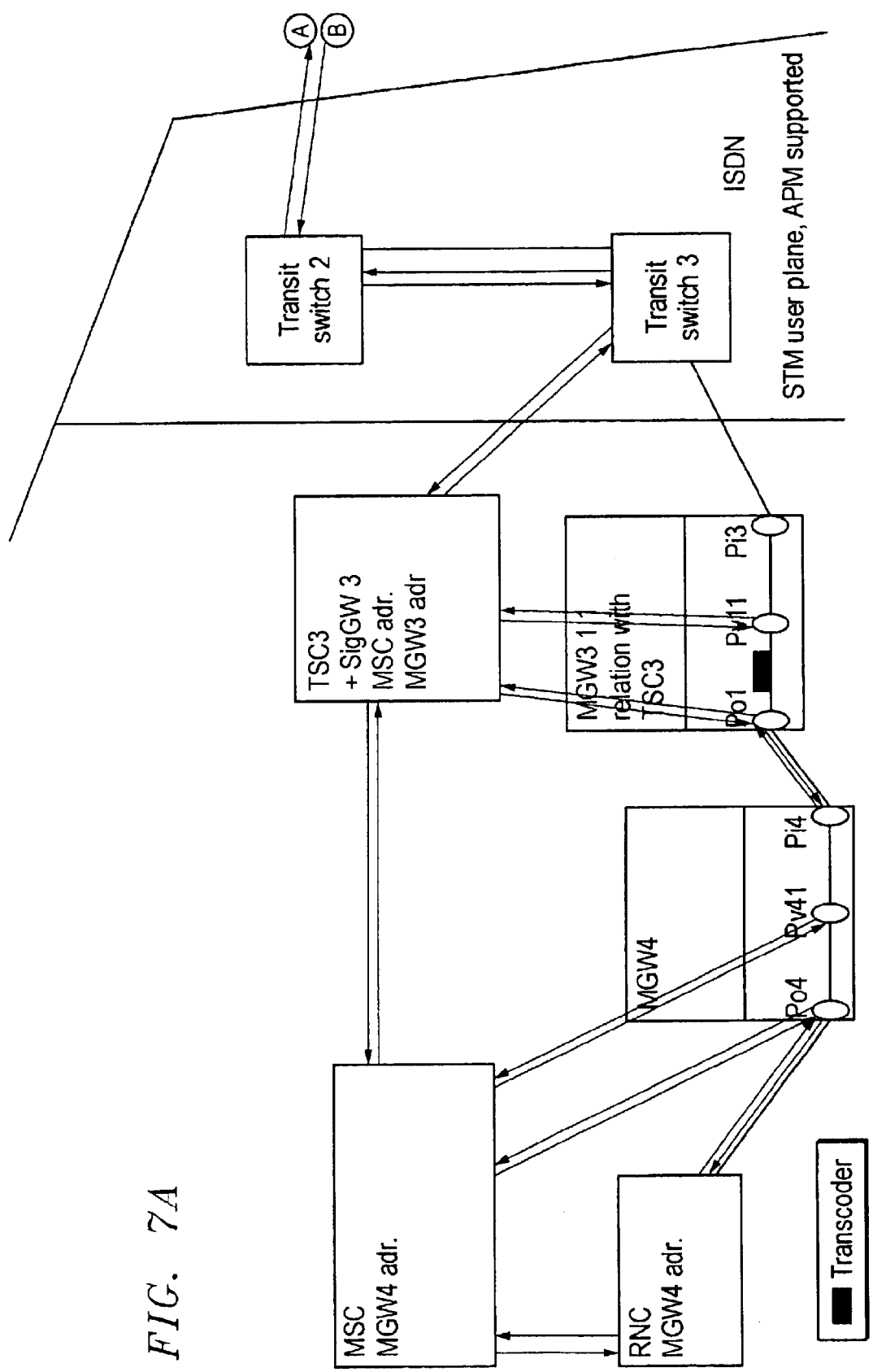
FIG. 7 is a block diagram illustrating basic call setup for roaming UE call leg in home PLMN and roaming UE call leg in visitor PLMN, MGW address being transported in the backward direction.
Figure 7B:
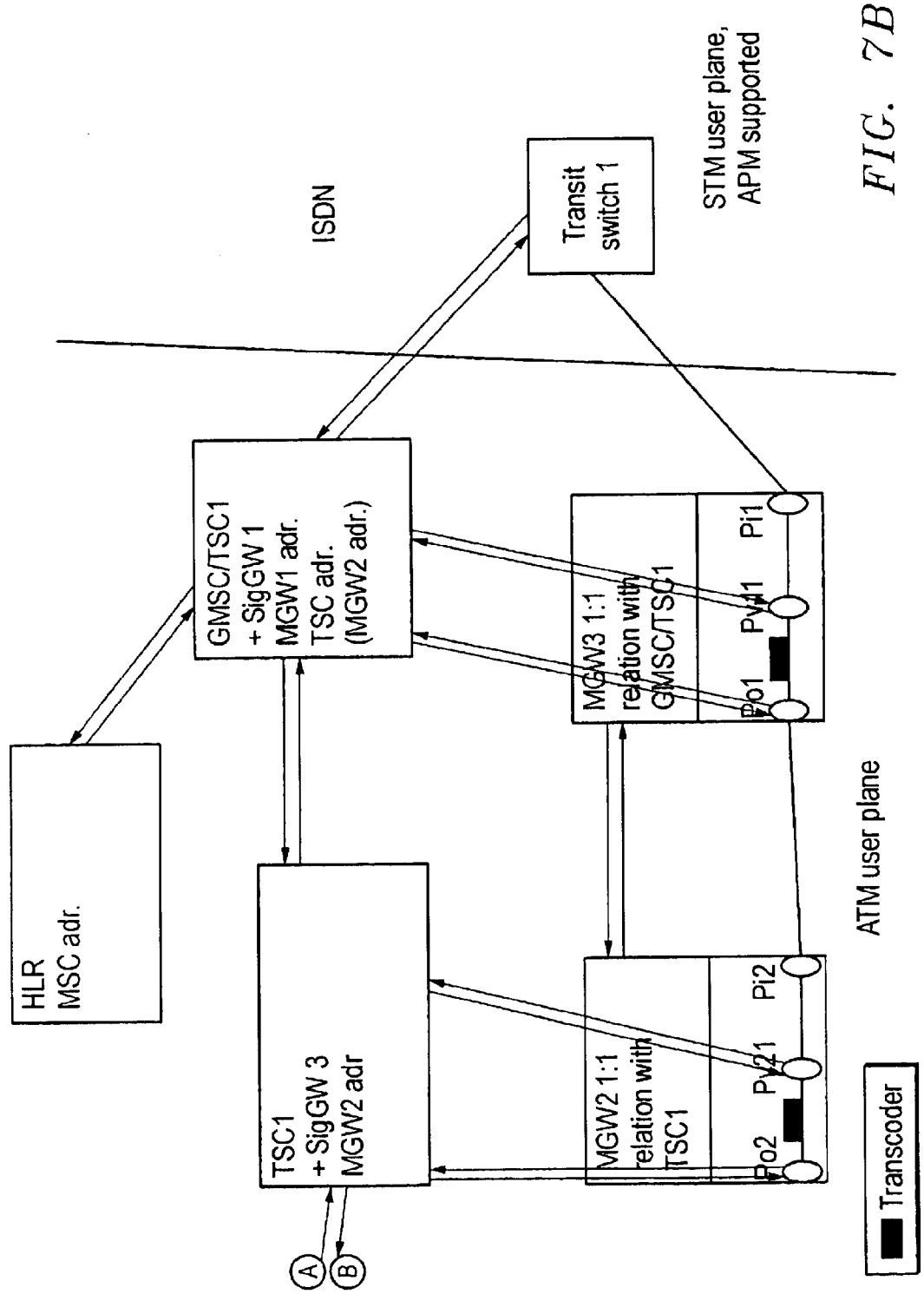

1. ISDN, Initial Address Message IAM (OPC, DPC, CIC) Call setup is requested from an external ISDN network for a mobile terminated call attempt. In this example the GMSC1/TSC1 and the Signaling Gateway 1 are collocated.
2. DCP, resource request (MGW1, CIC) Resources are requested from the MGW1 for the incoming call identified by its CIC, which were chosen by the transit switch 1 of the ISDN network.
3. DCP, resource response (Pi1, Pv11)
An incoming point Pi1 and a virtual point Pv11 are returned from the MGW1.
4. MAP, SendRouting Information request The GMSC1 interrogates the HLR for routing information.
5. MAP, SendRouting Information response The GMSC1 receives the MSC address.
6. ISDN, Address Complete Message ACM The ACM message is sent from the GMSC1/TSC1 to the transit switch 1.
7. DCP, Through connect (Pi1, Pv11) The GMSC1/TSC1 commands the MGW1 to through connect the incoming point Pi1 and the virtual point Pv11.
8. ISDN, IAM (OPC, DPC, CIC, CODEC (x, y)) The IAM message is sent from the GMSC1/TSC1 to the MSC. The MSC selects the MGW2.
9. RANAP, Paging
10. DTAP, Paging Response
11. DTAP, Setup (CODEC x, y))
12. DTAP, Call confirmed (CODEC x)
13. DCP, resource request (MGW2) Resources are requested for the incoming call identified by its CIC.
14. DCP, resource response (Pi2, Pv21) An incoming point Pi1 and a virtual point Pv21 are returned from the MGW2.
15. ISUP, new APM (MGW2, Pi2, CODEC (x))
16. DCP, Setup connection (MGW1, MGW2, Pv11, Pi2) The GMSC1/TSC1 requests resources for an outgoing call identified by its virtual CIC and commands the MGW1 to set up a connection towards Pi2 in MGW2.
17. AAL2, Establish Request
18. AAL2, Establish confirm
19. DCP, Setup connection response (Po1) The MGW1 signals back that the outgoing connection has been set up successfully and returns an outgoing point Po1.
20. DCP, Through connect (Po1, Pv11) The GMSC1/TSC1 commands the MGW1 to through connect the outgoing point Po1 and the virtual point Pv11.
21. DCP, Through connect (Pi2, Pv21)
The MSC commands the MGW2 to through connect the incoming point Pi2 and the-virtual point Pv21.
22. DCP, resource request (MGW2, Pv21) Resources are requested for the outgoing traffic.
23. DCP, resource response (Po2) An outgoing point Po2 is returned from the MGW2.
24. RANAP, Assignment Request
25. AAL2, Establish Request
26. AAL2, Establish confirm
27. RANAP, Assignment Response
28. DTAP, Alert
29. ISDN, Address Complete Message ACM
30. ISDN, Call Proceeding CPG
31. DTAP, Connect
32. DTAP, Connect ack
33. DCP, Through connect (Po2, Pv21) The MSC commands the MGW2 to through connect the outgoing point Po2 and the virtual point Pv21.
34. ISUP, Answer Message ANM
35. ISUP, Answer Message ANM
36. ISDN, Initial Address Message IAM (OPC, DPC, CIC) Call setup is requested from an external ISDN network for a mobile terminated call attempt. In this example the GMSC2/TSC2 and the Signaling Gateway 2 are collocated.
37. DCP, resource request (MGW3, CIC) Resources are requested from the MGW3 for the incoming call identified by its CIC, which were chosen by the transit switch 2 of the ISDN network.
38. DCP, resource response (Pi3, Pv31) An incoming point Pi3 and a virtual point Pv31 are returned from the MGW3.
39. MAP, SendRouting Information request The GMSC2 interrogates the HLR for routing information.
40. MAP, SendRouting Information The GMSC2 receives the MSC address.
41. ISDN, Address Complete Message ACM The ACM message is sent from the GMSC2/TSC2 to the transit switch 2.
42. DCP, Through connect (Pi3, Pv31) The GMSC2/TSC2 commands the MGW3 to through connect the incoming point Pi3 and the virtual point Pv31.
43. ISDN, Initial Address Message IAM (OPC, DPC, CIC) The IAM message is sent from the GMSC2/TSC2 to the MSC, which is controlling the MGW2.
44. DTAP, Setup (CODEC (x))
45. DTAP, Call confirmed (CODEC (x)
46. DCP, resource request (MGW2) Resources are requested for the incoming call identified by its CIC.
47. DCP, resource response (Pi22, Pv22) An incoming point Pi2 and a virtual point Pv21 are returned from the MGW2.
48. DTAP; Alert 49. ISDN, Address Complete Message ACM
50. ISDN, Call Proceeding CPG
51. DTAP, HOLD (B)
52. DTAP, HOLD ACK
53. ISUP, Call Proceeding Message CPG (B held)
54. ISUP, Call Proceeding-Message CPG (B held)
55. ISUP, new APM (MGW2, Pi22, CODEC (x))
56. DCP, Setup connection (MGW3, MGW2, Pv31, Pi22) The GMSC2/TSC2 requests resources for an outgoing call identified by its virtual CIC and commands the MGW3 to set up a connection towards Pi22 in MGW2.
57. AAL2, Establish Request
58. AAL2, Establish confirm
59. DCP, Setup connection response (Po3) The MGW3 signals back that the outgoing connection has been set up successfully and returns an outgoing point Po3.
60. DCP, Through connect (Po3, Pv31) The GMSC2/TSC2 commands the MGW3 to through connect the outgoing point Po3 and the virtual point Pv31.
61. DCP, Through connect (Pi22, Pv22) The MSC commands the MGW2 to through connect the incoming point Pi22 and the virtual point Pv22.
62. DCP, Disconnect (Po2, Pv21)
63. DTAP, Connect
64. DTAP, Connect ack
65. DCP, Through connect (Pv22, Po2) The MSC commands the MGW2 to through connect the virtual point Pv22 and the outgoing point Po2. This connects the existing user plane between RNC and MGW2 with the user plane of subscriber C.
66. ISUP, Answer Message ANM
67. ISUP, Answer Message ANM FIG. 7 shows a roaming UE call leg in home PLMN and roaming UE call leg in visitor PLMN, for MGW transported in the backward direction.

This example shows the interworking between a first transit network, where the terminating call is received, an ATM based home PLMN, where the IAM/APM mechanism is implemented, an STM based ISUP network, where IAM/APM mechanism is implemented and a terminated visited PLMN, where IAM/APM mechanism is implemented.

For the visited PLMN the detailed signal description can be found in the above description relating to FIG. 2. Similarly, for the home PLMN on the right side the detailed description can be found in the above description relating to FIG. 3.

Here a served UE B receives a call from a subscriber A over the transit switch 1. The IAM is received with no CODEC list and TSC1 adds a CODEC list to the IAM and forwards the IAM to the GMSC, which interrogates the HLR, and gets an MSC address. The MSC belongs to another PLMN and can be only be reached over an STM network. Therefore the GMSC forwards the IAM with the CODEC list to a TSC2, which is controlling the MGW2. The TSC2 is interworking with a transit STM network, which consists of transit switch 2 and transit switch 3. This transit network forwards the received IAM from TSC2 with the CODEC list to the TSC3. TSC3 can reduce this list, if it does not support all CODEC types. TSC3 forwards the IAM with the CODEC list to the MSC, which sends the list in the set up message to the UE and the UE replies the chosen CODEC in the call confirmed message. The MSC chooses then MGW4 and gives MGW4 address, a logical incoming point and the chosen CODEC type back in the APM back to TSC3.

TSC3 sets up the user plane between MGW3 and MGW4 and links in the chosen CODEC. TSC3 sends back the chosen CODEC in the APM message to the TSC2. TSC2 links in the chosen CODEC in MGW2 and signals in the APM the MGW2 address, a logical incoming point and the chosen CODEC. GMSC/TSC1 links in the CODEC and sets up the user plane from MGW1 to MGW2 and indicates that the user plane has been set up to the transit switch 1.

As all CODECs are of the same type the CODEC in MGW2 and the CODEC in MGW3 can go to the TFO mode. In TFO mode the CODEC is bypassed and compressed CODEC speech can be transferred over the PCM network in between. By this the speech quality improves as a transcoding can be omitted.

The above described examples illustrate the new approach to separation of call control and bearer control for implementation of GSM and UMTS core networks, with transport layer address and logical points being transported in the backward direction.

I claim:

1. A method for setting up a call in a wireless communication network with a separation of call control and bearer control, the call control being performed by control nodes and the bearer control being performed by at least one media gateway, comprising:

receiving a call setup request at a first control node;

forwarding the call setup request from the first control node to a succeeding control node and, if the call setup request is received from a control node of a further network, selecting a media gateway and sending the media gateway address to the succeeding control node;

receiving the call setup request in the succeeding control node; and selecting a media gateway at the succeeding control node and sending the media gateway address in a backward direction to preceding control nodes if at least one of a user plane modification is necessary and a media gateway is needed for switching.

2. The method of claim 1, wherein after receiving the call setup request, the succeeding control node becomes a control node in charge, and further comprising:

selecting a media gateway at the control node in charge and sending the media gateway address in a backward direction to preceding control nodes if a user plane modification is necessary or a media gateway is needed for switching; and forwarding the call setup request to a further succeeding control node if the control node in charge does not serve a terminating user equipment.

3. The method of claim 1, wherein the first control node is one of a mobile services switching center, a gateway mobile services switching center, and a transit switching center.

4. The method of claim 1, further comprising transporting a list of CODECs provided by an originating user equipment through the wireless communications network to the terminating user equipment, the list of CODECs being used to select resources for payload modification, and after the selection of resources, adapting the payload modification according to said selected resources.

5. The method of claim 4, wherein the step of sending the list of CODECs comprises sending the list of CODECs within an initial address message.

6. The method of claim 1, further comprising the step of transporting a selected CODEC type from an originating user equipment to the terminating user equipment.

7. The method of claim 6, further comprising selecting a further CODEC responsive to the information about the selected CODEC type, for further transcoding at the edge of a network and a user equipment to facilitate tandem free operation.

8. The method of claim 6, further comprising avoiding further transcoding within a network responsive to the information about the selected CODEC type.

9. The method of claim 1, further comprising the step of transporting a selected framing type through the network.

10. The method of claim 1, wherein the step of selecting the media gateway further comprises revoking the selection of media gateway performed by a preceding control node, wherein the revocation is sent in a backward direction to the preceding nodes.

11. The method of claim 10 wherein the step of revoking the media gateway further includes re-sending from the control node to the terminating user equipment the lists of CODECs received at the control node which performed the first selection of a media gateway, the list of CODECs being used to select resources for payload modification and after a selection being adapted according to the selected resources.

12. The method of claim 10, wherein the step of revoking the selection of the media gateway further comprises revoking selections of framing type, coding type and the media gateway address.

13. The method of claim 1, further comprising the step of reserving at the media gateway a logical point identifying reserved resources in the media gateway for handling the payload of a call, in response to a request for resources.

14. The method of claim 11, wherein the step of sending an address of the media gateway in a backward direction to the preceding control nodes further comprises transferring an identification of the logical point in the backward direction to the first control node.

15. A wireless communication network comprising:
plural control nodes, including a first control node and at least one further control node, the control nodes receiving information about a call, one of the further control nodes requesting resources from at least one media gateway (MGW), of plural MGWs, for handling a user plane of the call; and
the at least one MGW including plural logical points for connecting plural MGW resources for handling the user plane of the call, the at least one MGW being adapted to identify one of the logical points to the one of the further control nodes in response to a request for resources from the one of the further control nodes, whereby the plural control nodes use the at least one MGW for handling the user plane of the call,
wherein the one of the further control nodes transfers an address for the MGW in a backward direction to the preceding control nodes.

16. The wireless communication network of claim 15 wherein at least one of the plural MGW resources is one of a transcoder, a conference call device a modem, a tone generator, or an announcement device.

17. The wireless communication network of claim 15 wherein the communication between the control node and the MGW regarding the control and reservation of resources in said MGW is performed using a Device Control Protocol.

18. The wireless communication network of claim 15 wherein the network uses an N-ISUP interface between the control nodes for call control.

19. The wireless communication network of claim 15 wherein the user plane is transferred compressed within and between MGWs.

20. A wireless communication network comprising:
plural control nodes, including a first control node and at least one further control node, the control nodes receiving information about a call, one of the further control nodes requesting resources from at least one media gateway (MGW), of plural MGWs, for handling a user plane of the call; and
the at least one MGW including plural logical points for connecting plural MGW resources for handling the user plane of the call, the at least one MGW being adapted to identify one of the logical points to the one of the further control nodes in response to a request for resources from the one of the further control nodes, whereby the plural control nodes use the at least one MGW for handling the user plane of the call,
wherein the one of the further control nodes transfers information on the identified logical points for the MGW in a backward direction to the preceding control nodes.

21. A method of setting up a call in wireless communication network with a separation of call control and bearer control, the call control being implemented in control nodes, the bearer control being implemented in at least one media gateway, comprising:
receiving a call setup request in a first control node;
receiving a list of transcoders in said first control node;
forwarding from the first control node the call setup request and the list of transcoders to a succeeding control node;
sending the media gateway address in a backward direction to preceding control nodes at the succeeding control node if at least one of a user plane modification is necessary and a media gateway is needed for switching; and
forwarding the call setup request and the list of transcoders if the control node does not serve a terminating user equipment, and further forwarding an address of the selected media gateway to a succeeding control node if a media gateway has been selected.

22. A method for setting up a call in a select control node for a wireless communication network with a separation of call control and bearer control, the call control being performed by control nodes and the bearer control being performed by at least one media gateway, comprising:
receiving a call setup request at the select control node from a requester;
forwarding the call setup request from the select control node to another control node and, if the call setup request is received from a control node of a further network, selecting a media gateway and sending the media gateway address to the another control node;
receiving a media gateway address from the another control nodes if at least one of a user plane modification is necessary and a media gateway is needed for switching; and
commanding the requestor to setup the user plane connection using selected media gateways.

23. The method of claim 22, wherein the select control node is one of a mobile services switching center, a gateway mobile services switching center, and a transit switching center.

24. The method of claim 22, further comprising receiving a list of transcoders in the select control node and forwarding the list of transcoders from the select control node to the another control node.

25. A method for setting up a call in a select control node for a wireless communication network with a separation of call control and bearer control, the call control being performed by control nodes and the bearer control being performed by at least one media gateway, comprising:

- receiving a call setup request at the select control node from another control node and, if the call setup request is from a further network, the call setup request including a first media gateway address;
- selecting a media gateway at the select control node and returning a second media gateway address in a backward direction to the another control node if at least one of a user plane modification is necessary and a second media gateway is needed for switching; and
- the select control node commanding a resource to setup the user plane connection using the selected media gateway.

26. The method of claim 25, wherein the select control node is one of a mobile services switching center, a gateway mobile services switching center, and a transit switching center.

27. The method of claim 25, wherein the step of selecting the media gateway further comprises revoking the selection of media gateway performed by the another control node, wherein the revocation is sent in a backward direction to the another control node.

28. The method of claim 27 wherein the step of revoking the media gateway further includes re-sending from the select control node to terminating user equipment lists of CODECs received at the select control node, the list of CODECs being used to select resources for payload modification and after a selection being adapted according to the selected resources.

29. The method of claim 27, wherein the step of revoking the selection of the media gateway further comprises revoking selections of framing type, coding type and the media gateway address.

30. A control node for a wireless communication network with a separation of call control and bearer control, comprising:

- a server for operative connection to other control nodes and at least one media gateway, the server implementing application logic for call control, the application logic comprising receiving call setup requests from service requesters or other control nodes, and if the call setup request is from a service requester forwarding the call setup request to another control node and, if the call setup request is received from a control node of a further network, selecting a media gateway and sending the media gateway address to the another control node, and if the call setup request is from other control nodes selecting a media gateway and sending the media gateway address in a backward direction to other control nodes if at least one of a user plane modification is necessary and a media gateway is needed for switching, so that, in use, call control is performed by control nodes and bearer control is performed by at least one media gateway.

31. The control node of claim 30, wherein the control node communicates with media gateways regarding control and reservation of resources using a Device Control Protocol.

* * * * *

UNITED STATES PATENT AND TRADEMARK OFFICE
CERTIFICATE OF CORRECTION

PATENT NO. : 6,832,088 B1 Page 1 of 1
APPLICATION NO. : 09/609478
DATED : December 14, 2004
INVENTOR(S) : Stumpert It is certified that error appears in the above-identified patent and that said Letters Patent is hereby corrected as shown below:

In Column 1, Line 28, delete "MSCS" and insert -- MSCs --, therefor.

In Column 2, Line 14, delete "LTE" and insert -- UE --, therefor.

In Column 7, Line 24, delete "GMSC 1" and insert -- GMSC1 --, therefor.

In Column 8, Line 50, after "DCP" delete ";" and insert -- , --, therefor.

In Column 11, Line 15, delete "UE I" and insert -- UE 1 --, therefor.

In Column 13, Line 13, delete "subscribers" and insert -- subscriber --, therefor.

In Column 14, Line 67, after "DTAP" delete ";" and insert -- , --, therefor.

Signed and Sealed this

Sixteenth Day of September, 2008

JON W. DUDAS
*Director of the United States Patent and Trademark Office*